Figure 1:
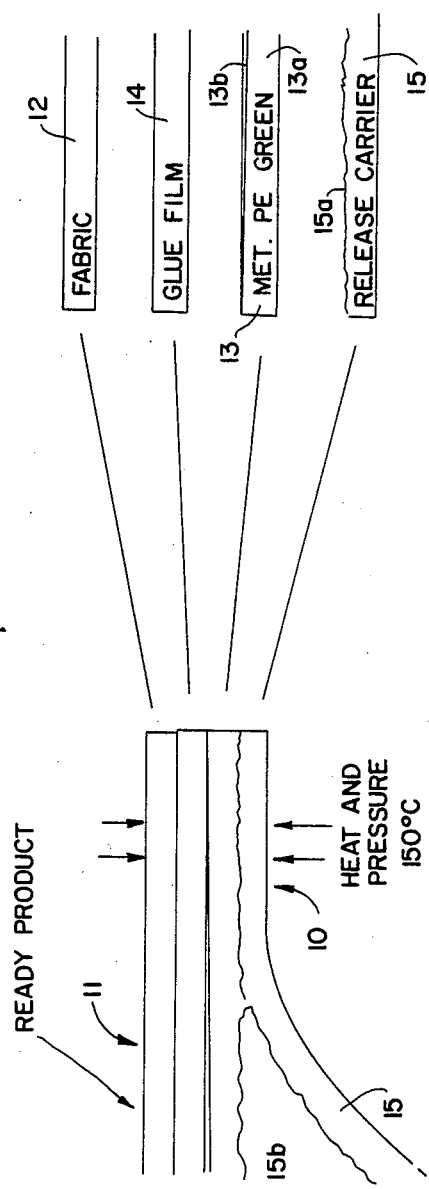

United States Patent [19]

Karlsson

[11] Patent Number: 4,557,965

[45] Date of Patent: Dec. 10, 1985

[54] CAMOUFLAGE CONTROLLING REFLECTION OF BOTH LONG AND SHORT RADAR WAVES

[75] Inventor: Lars Karlsson, Gamleby, Sweden

[73] Assignee: Diab-Barracuda AB, Laholm, Sweden

[21] Appl. No.: 597,163

[22] Filed: Apr. 5, 1984

[30] Foreign Application Priority Data

Apr. 7, 1983 [SE] Sweden ................................ 8301908

[51] Int. Cl.$^4$ .............................................. B32B 5/12
[52] U.S. Cl. .................................... 428/196; 428/209; 428/251; 428/252; 428/919
[58] Field of Search ............... 428/196, 209, 251, 252, 428/919

[56] References Cited

U.S. PATENT DOCUMENTS

| 3,733,606 | 5/1973 | Johansson | 428/919 |
| 4,001,827 | 1/1977 | Wallin | 428/919 |
| 4,034,375 | 7/1977 | Wallin | 428/919 |
| 4,287,243 | 9/1981 | Nielsen | 428/919 |
| 4,467,005 | 8/1984 | Pusch | 428/919 |

*Primary Examiner*—Marion C. McCamish
*Attorney, Agent, or Firm*—Lee, Smith & Zickert

[57] ABSTRACT

Camouflage material incorporates means for specifying and providing predetermined degree of reflection of incident radar waves which is optimum for particular use environments. The overall pattern is the resultant of control of reflection of longer radar wavelengths by a layer of electrically conductive fibrils of controlled density and reflection of shorter radar wavelengths by thin mosaic layer of metal.

18 Claims, 4 Drawing Figures

CAMOUFLAGE CONTROLLING REFLECTION OF BOTH LONG AND SHORT RADAR WAVES

The object of this invention is to provide a thin but self-supporting camouflage material which reflects to a pre-determined extent radar waves in the W-band (96 GHz, 3 mm), K-band (35 GHz, 9 mm), and X-band (9 GHz, 30 mm). With optimum reflection of radar waves in all three wave bands, low emission of energy in the 3–5 $\mu$m and 8–14 $\mu$m wave band ranges, desirable also for thermal camouflage, is effected.

An important feature of the present invention resides in the ability that it offers to control the extent to which the radar waves of surveillance instruments are reflected to thwart detection of objects covered by the camouflage material. Separate but predeterminable and interacting means are provided to control the reflection of incident radar waves of differing wave lengths, making it possible to tailor the camouflage to the particular conditions obtaining in the location of use.

The camouflage material comprises a laminate of several thin layers, one of the layers being composed of a haphazard array of lengths of electrically conductive fibrils, another layer comprising a very thin film of metal which has been cracked or otherwise formed into a mosaic pattern of small, separate areas. In general, the fibril layer controls the reflection of the longer electromagnetic waves while the mosaic, metallic layer controls the reflection of the shorter waves.

Additional layers of the laminate provide supporting structure and also optical camouflage. Certain plastic films also contribute to radar and thermal camouflage properties as will be described.

The fibrils or filaments employed in carrying out the invention may be composed of any of several different electrically conductive materials such as metals, ordinary carbon steel being a useful example, and carbon fibers and metalized plastic fibers. They should be less than 20 microns in diameter and longer than 3 cm in length. These dimensions are not critical; filaments 8–10 microns, for example, being quite satisfactory from both practical usage and functional viewpoints.

The mosaic metal film layer may be provided by very thin aluminum foil or by a vacuum deposited coating e.g., aluminum on a plastic film carrier, the layer being broken up, crackled, subsequent to deposition.

The metal fibrils and mosaic metal layer may be incorporated into the camouflage material using any one of several different production procedures. These will be described with reference to the accompanying drawing which comprises three figures each of which is a schematic representation of a process of making three exemplary camouflage products each of which embodies the invention and differs in other respects.

In the drawings,

FIGS. 1, 2, 3, and 4 illustrate diagrammatically four examples of camouflage materials embodying the invention and procedures of making them.

FIG. 1 illustrates a simple form of the invention. Four layers of materials are brought together in a laminating machine 10 wherein the assembly is subjected to heat and pressure to produce the integrated camouflage material 11. The principal supporting layer for the camouflage material is a fabric 12 woven from, preferably, multifilament polyamide threads. The metal fibrils are incorporated into the fabric by spinning the fibrils into the multifilament thread which is incorporated into the fabric. Since the portion of incident radar waves that will be reflected by the fibril-containing layer is proportional to the density of the metal fibril content of the fabric, a suitable layer 12 may be prepared by alternating fibril-containing threads with polyamide threads containing no metal or other conductive fibrils in both the warp and the weft of the woven fabric. The fibril content may comprise from two to five percent of the total fiber, fibril and polyamide content of the fabric. For example, a 5% metal fabric will reflect about 40% of incident electromagnetic waves in the X-band.

The woven fabric may be preliminarily laminated between two polyvinyl chloride films, if desired, and either the fabric or the plastic film may be coloured green for optical camouflage effect.

Layer 13 is a composite material comprising a film 13a of polyethylene, preferably coloured green, with a coating layer 13b of aluminum which may have been vacuum deposited on the supporting layer of plastic film in known manner. A film 14 of glue is interposed between fabric layer 12 and metalized plastic layer 13 and a transfer release band 15 having a matte surface 15a is arranged for contact of the matte surface with the surface of the polyethylene film 13a opposite from the metal coating 13b.

After lamination of the several layers, the transfer release band 15 is drawn away from the integrated camouflage material 11 leaving a matte surface 15b as the exposed surface of the outer polyethylene film layer of the camouflage material. This matte surface is desirable in order to avoid specular reflection of visible and thermal waves. Also, when heated to incipient fusion of the polyethylene film, the pressure applied to the assemblage of layers in the laminator causes the plastic material to press into the woven fabric with the result that the thin coating of aluminum is broken up into a mosaic pattern of small, separated individual areas.

The camouflage material of FIG. 1 will reflect radar waves to a predetermined extent depending especially upon the fibril content of the fabric layer and, in the manner more fully described in co-pending patent application Ser. No. 568,606, emits energy in the thermal range only to the extent desired to avoid contrast with surrounding terrain and consequent detection by surveillance instruments. Optical camouflage is also provided.

Figure 2:
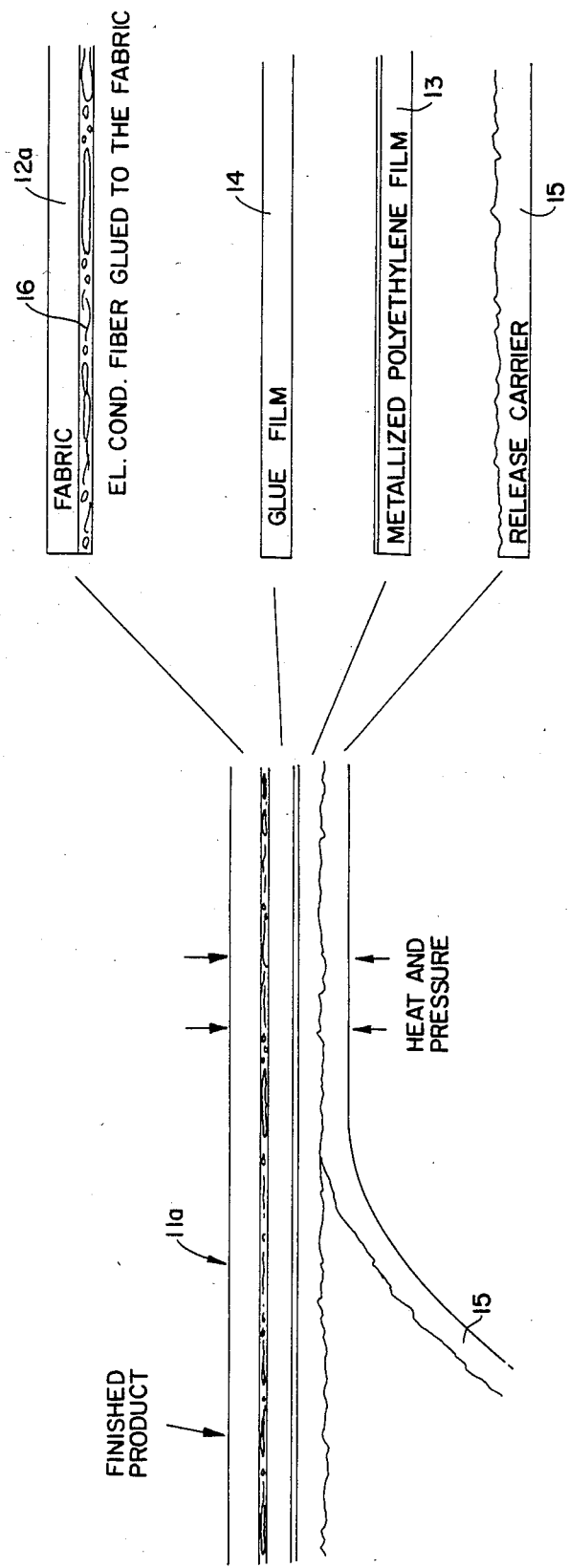

An alternative method of producing a camouflage material similar to that described with reference to FIG. 1, but having somewhat greater flexibility with respect to control of the extent to which radar waves are reflected, is illustrated in FIG. 2. In this case, the fabric layer 12a may consist of a material woven entirely from monofilament or multifilament threads of polyamide plastic. The sole function of the fabric is to support the camouflage material; the metal fibrils are not contained in the thread. Instead, electrically conductive fibers, metal, carbon or metalized plastic, are spread over the surface of the fabric as described in U.S. Pat. No. 4,001,827 in unit amount sufficient to effect the predetermined proportionate reflection of radar waves. The use of a more or less standard supporting fabric and the separate application of the layer of conductive fibers offer more fascile flexibility for meeting specifications of the camouflage material as to the degree of reflection of radar waves. In addition to altering the density of a uniform layer of electrically conductive fibers, it would also be possible to vary the density to render reflection non-uniform in the same piece of camouflage material, if desired.

A metalized polyethylene film 13 is arranged to be adjacent the layer 16 of conductive fiber, a film 14 of glue being interposed to provide the desired adherence of the fabric, conductive fiber and metalized film. For purposes already described, the release band 15 having an impressionable matte surface completes the array of layers fed into the laminator. After withdrawal of the release band following lamination the camouflage material 11 is functionally similar to that above described with reference to FIG. 1.

Figure 3:
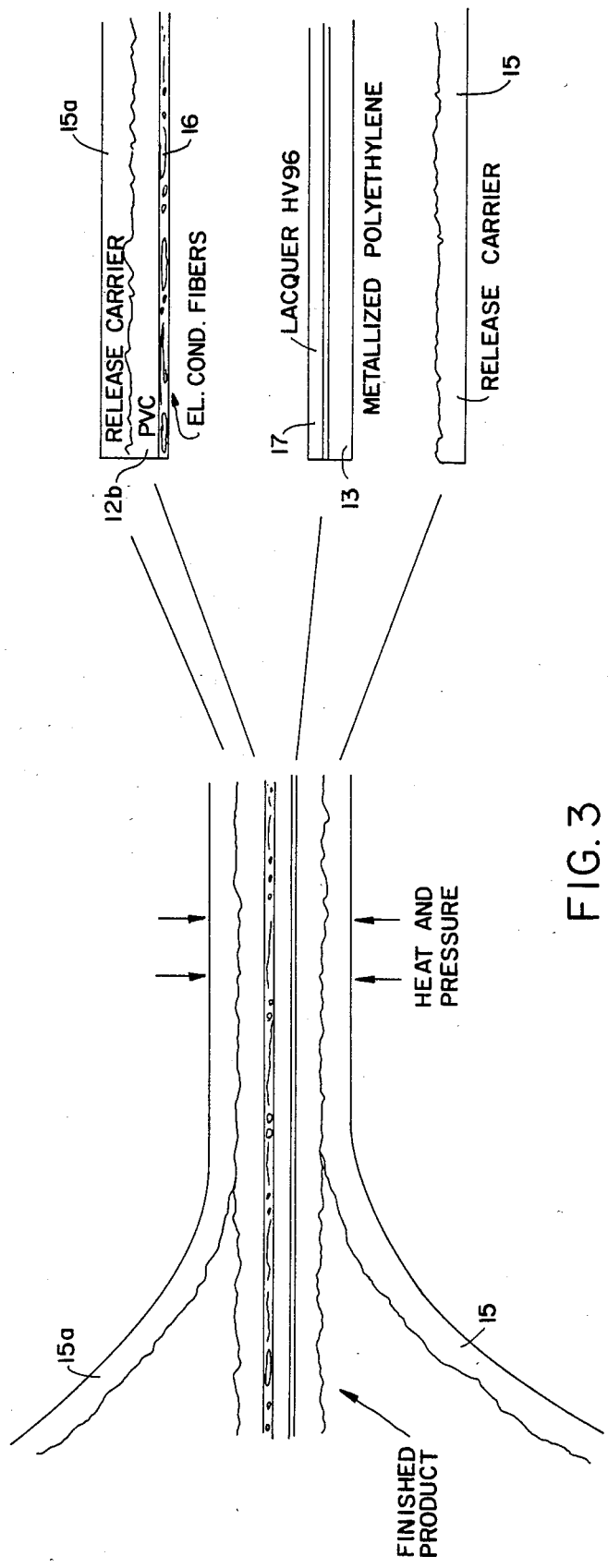

In the example illustrated in FIG. 3, a supporting film of polyvinyl chloride is employed instead of a woven fabric. Electrically conductive fibers 16 are spread over a surface of polyvinyl chloride film layer 12b and a matte-surfaced release band 15a is arranged to engage the other surface of the polyvinyl chloride film. Instead of providing a separate film of glue to secure the several layers of the laminate together, a coating 17 of a lacquer (e.g. Svensk Farg HV 96), effective to bind the metalized polyethylene layer 13, and polyvinyl chloride film 12b and electrically conductive fibers 16 together. A release band 15 with its matte surface facing the polyethylene film completes the array of layers fed into a laminator as indicated. After removal of the release bands, a camouflage material having the pre-determined reflection characteristics in all radar wave bands and thermal and optical camouflage features is produced.

Figure 4:
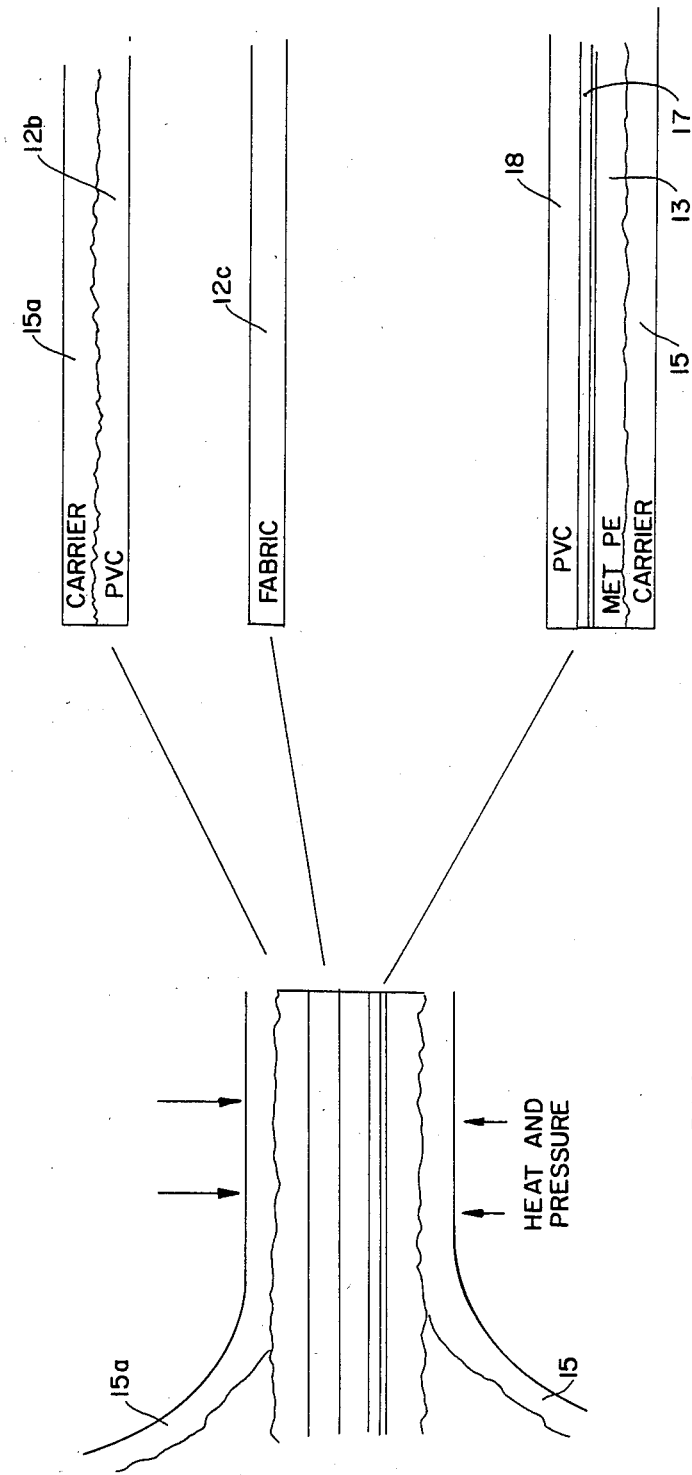

A particularly useful and efficient method of production of a camouflage material having a polyethylene surface on one side and a polyvinyl chloride surface on the other is illustrated in FIG. 4. A duplex layer comprised of a matte-surfaced release band 15a having a coating of polyvinyl chloride plastisol over the matte surface is prepared in advance by curing the polyvinyl chloride. A sublaminate comprised of matte-surfaced release band 15, a layer of metalized polyethylene 13, a coating of lacquer 17 over the metal, and a layer of polyvinyl chloride plastisol is prepared in advance by passing through a laminator. These assemblies are then fed into a laminator with a supporting fabric 12c between them as shown. The supporting fabric may incorporate conductive fibrils with the threads composing the fabric as used in FIG. 1 or may have a separate layer of fibrils as illustrated and described with reference to FIG. 2. When the release bands have been pulled away, the result is a camouflage material having the desired radar reflecting characteristics and capable of presenting exterior surfaces having differing thermal emission properties.

The principal achievement of the invention herein described resides in the provision of a system that makes possible the production of camouflage material having a predetermined degree of reflection of electromagnetic waves in the radar spectrum, making possible the specification and production of optimum camouflage characteristics for the particular nature of the surroundings at the intended locations of use. Optical and thermal camouflage are provided along with the improved radar camouflage.

I claim:

1. Camouflage material comprising a laminate including a supporting layer therein substantially coextensive with said camouflage material, a polymer layer disposed at the ultimately exteriorly exposed side of said camouflage material, said polymer layer having a matte outer surface, and embodying means for reflecting incident radar waves throughout the radar electromagnetic spectrum to a predetermined extent with respect to the respective wavelength ranges within said spectrum, said means comprising electrically conductive fibrils arranged within said means for reflecting radar waves and distributed throughout an area substantially coextensive with said supporting layer and supported thereby and a thin layer of cracked metal substantially coextensive with and supported upon said polymer layer, said thin layer of crackled metal being glued to said support layer, the density of said fibrils being such that in combination with said layer of crackled metal a predetermined degree of reflection of incident radar waves is attained throughout the radar electromagnetic spectrum.

2. Camouflage material in accordance with claim 1 wherein said supporting layer comprises a woven fabric of multifilament thread and said electrically conductive fibrils are contained within said thread.

3. Camouflage material in accordance with claim 2 wherein said thread is composed of polyamide.

4. Camouflage material in accordance with claim 2 wherein a predetermined portion only of said thread contains said electrically conductive fibrils incorporated therein.

5. Camouflage material in accordance with claim 1 wherein said fibrils are present as a haphazard array of fibrils secured between said one of said supporting layers and said layer of crackled metal.

6. Camouflage material in accordance with claim 5 wherein said one of said supporting layers is a film of polyvinyl chloride.

7. Camouflage material in accordance with claim 1 wherein said electrically conductive fibrils are composed of steel.

8. Camouflage material in accordance with claim 1 wherein said electrically conductive fibrils are composed of carbon.

9. Camouflage material in accordance with claim 1 wherein said electrically conductive fibrils are composed of metalized plastic fibers.

10. Camouflage material comprising a laminate including a supporting layer, said supporting layer comprising a first polymer layer disposed at the ultimately interiorly exposed side of said camouflage material, said first polymer layer having a matte outer surface and extending substantially coextensive with said camouflage material, a second polymer layer disposed at the ultimately exteriorly exposed side of said camouflage material, said second polymer layer having a matte outer surface, and embodying means for reflecting incident radar waves throughout the radar electromagnetic spectrum to a predetermined extent with respect to the respective wavelength ranges within said spectrum, said means comprising electrically conductive fibrils distributed on said supporting layer and supported thereby, and a thin layer of crackled metal substantially coextensive with and supported upon said second polymer layer, said thin layer of metal being glued to the supporting layer, the density of said distributed fibrils being such that in combination with said layer of crackled metal a predetermined degree of reflection of incident radar waves is attained throughout the radar electromagnetic spectrum.

11. Camouflage material in accordance with claim 10 wherein said electrically conductive fibrils are composed of steel.

12. Camouflage material in accordance with claim 10 wherein said electrically conductive fibrils are composed of carbon.

13. Camouflage material in accordance with claim 10 wherein said electrically conductive fibrils are composed of metalized plastic fibers.

14. Camouflage material comprising a laminate including a supporting layer therein substantially coextensive with said camouflage material, a first polymer layer disposed at the ultimately exteriorly exposed side of said camouflage material, said first polymer layer having a matte outer surface, second and third polymer layers applied to opposite sides of said supporting layer, said third polymer layer having a matte outer surface, said camouflage material embodying means for reflecting incident radar waves throughout the radar electromagnetic spectrum to a predetermined extent with respect to the respective wavelength ranges within said spectrum, said means comprising electrically conductive fibrils arranged within said means for reflecting radar waves and distributed throughout an area substantially coextensive with said supporting layer and supported thereby and a thin layer of crackled metal substantially coextensive with and supported upon said first polymer layer, said thin layer of crackled metal being glued to the second polymer layer, the density of said distributed fibrils being such that in combination with said layer of crackled metal a predetermined degree of reflection of incident radar waves is attained throughout the radar electromagnetic spectrum.

15. Camouflage material in accordance with claim 14 wherein said supporting layer comprises a woven fabric of multifilament thread and said electrically conductive fibrils are contained within said thread.

16. Camouflage material in accordance with claim 15 wherein said threads are composed of polyamide.

17. Camouflage material in accordance with claim 15 wherein a predetermined portion only of said thread contains said electrically conductive fibrils incorporated therein.

18. Camouflage material in accordance with claim 14 wherein said fibrils are present as a haphazard array of fibrils secured between said supporting layer and said layer of crackled metal.

* * * * *